Figure 1:
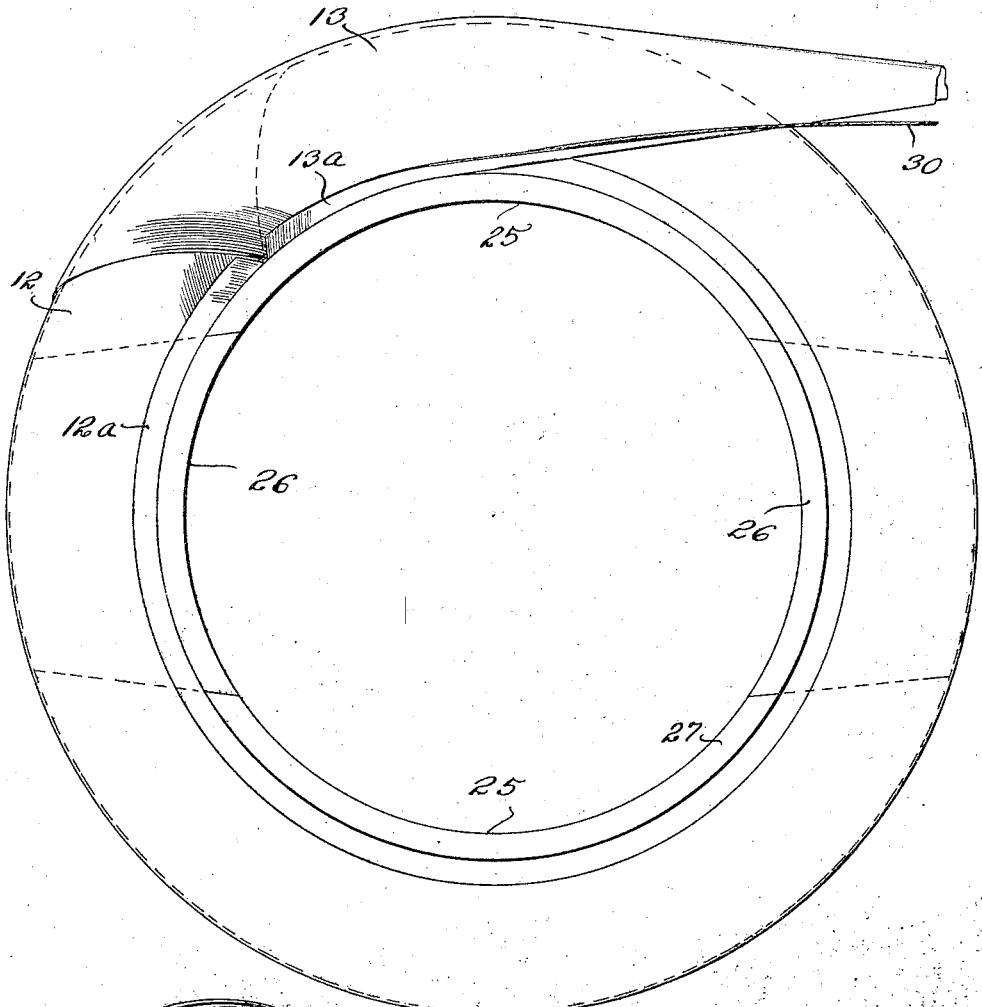

Dec. 28, 1926.  1,611,998
J. D. COMSTOCK
TIRE CASING AND PROCESS OF MAKING THE SAME
Filed June 26, 1924    3 Sheets-Sheet 1

INVENTOR
Jackson D. Comstock
BY Bates, Macklin, Goldrick & Teare
ATTORNEYS

Dec. 28, 1926.　　　　　　　　　　　　　　　1,611,998
J. D. COMSTOCK
TIRE CASING AND PROCESS OF MAKING THE SAME
Filed June 26, 1924　　3 Sheets-Sheet 2
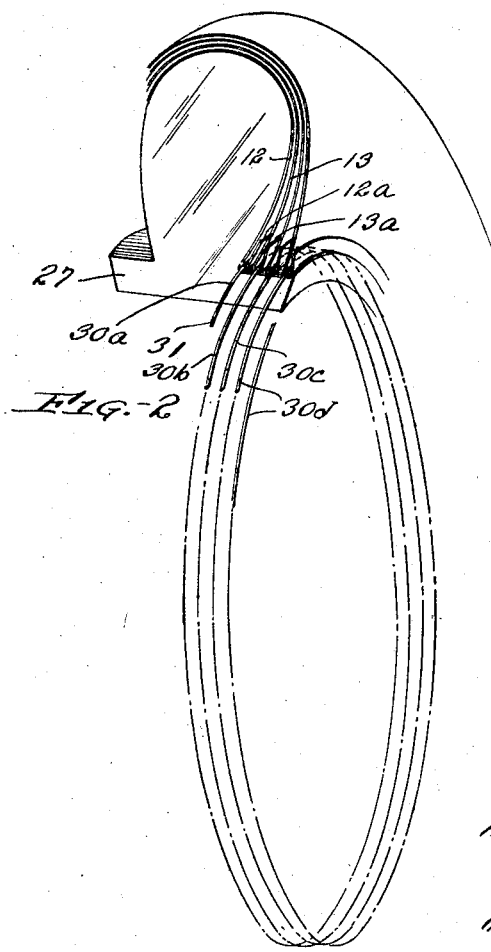
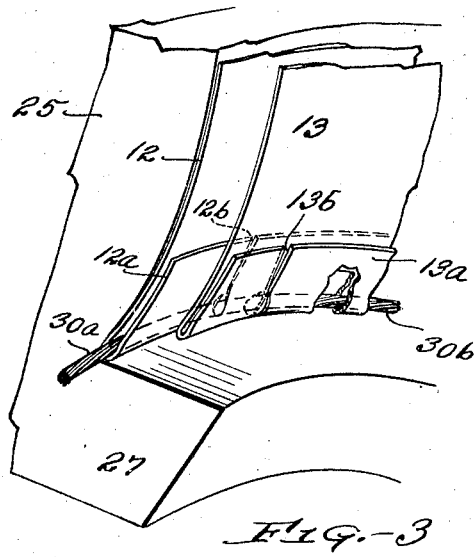
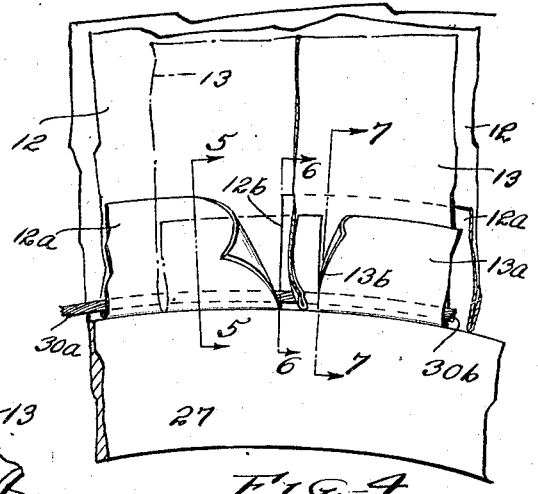
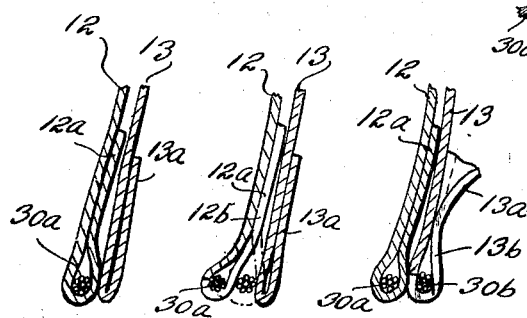

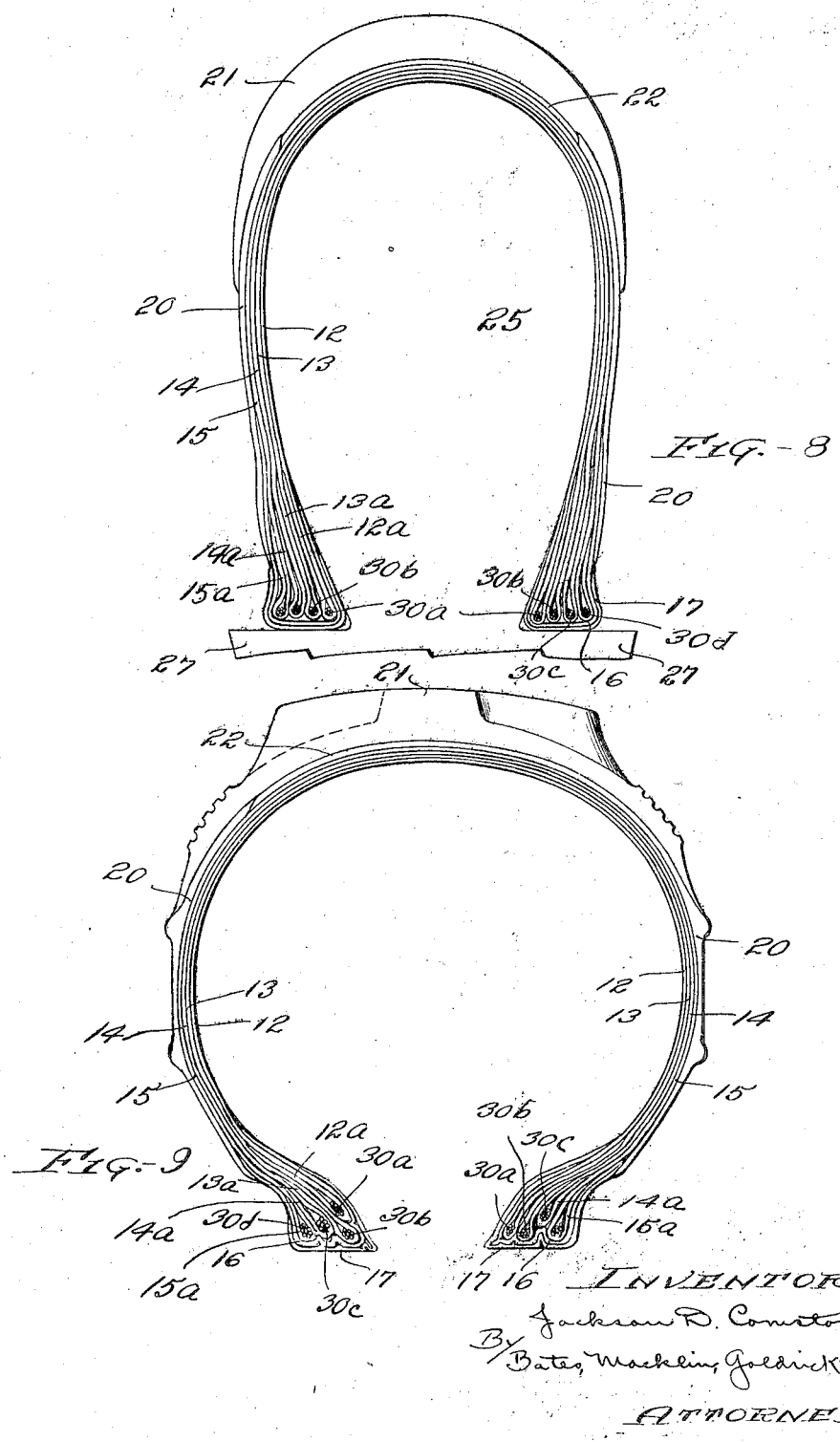

Patented Dec. 28, 1926.

1,611,998

UNITED STATES PATENT OFFICE.

JACKSON D. COMSTOCK, OF CHESTER, WEST VIRGINIA.

TIRE CASING AND PROCESS OF MAKING THE SAME.

Application filed June 26, 1924. Serial No. 722,441.

This invention relates to pneumatic tires and to a method of forming tire beads and carcasses.

It has heretofore been the prevailing practice when constructing a tire casing, to build non-expansible metallic rings into the beads of the tire casing by securing the annular edges of the fabric laminations constituting the tire about these single rings, thereby forming a bead structure which is substantially non-expansible radially. This is true of both the metal comprising the core of the beads as well as the overlying portions of the fabric laminations wrapped or stitched around the core. Of course, when the tire is formed, care is exercised to cause the several laminations to overlie one another evenly but the expansion into the vulcanizing mold causes the outer laminations to be stretched more than the inner ones and the result is that these outer laminations are subjected to greater strain. Also, regardless of how carefully the laminations are placed in position, certain laminations will usually be tighter than others. It has been observed, therefore, that under these circumstances when a tire is inflated, one or a few of the laminations carry most of the strain of the entire side wall and eventually become weakened or entirely give way, subsequently throwing the burden on to the other laminations. It will be seen, therefore, that if the laminations are evenly stretched, the life of the tire is inevitably greatly lengthened.

The general object of the present invention, therefore, is the provision of novel tire construction and a suitable process for building such a tire whereby each lamination comprising the tire casing is so formed at the bead that complete adjustability may take place between the tire laminations during the molding operation and whereby each lamination may so adapt itself to its stress environment in the tire structure that it may assume its full burden of stress.

More specifically my invention is directed to the provision of a tire structure wherein each lamination of the structure may be provided with an individual metallic bead member adjusted in the finished article to cause equal stress of the laminations. Preferably these comprise a continuation of an individual bead from an adjacent lamination or laminations of fabric whereby the composite bead structure may comprise individually secured edges of laminations, each extending around one of several convolutions of a continuous strand. Thus, the bead edges of each lamination may be of extreme adaptability to variations in transverse lamination stresses and variations in lamination width when the composite bead is finally formed in the mold.

Other objects of my invention will hereinafter be set forth in the following description which refers to the accompanying drawings illustrating a preferred method of carrying out the steps of constructing a tire casing, the laminations of which have individual beads. The essential characteristics are summarized in the claims.

Figure 10:
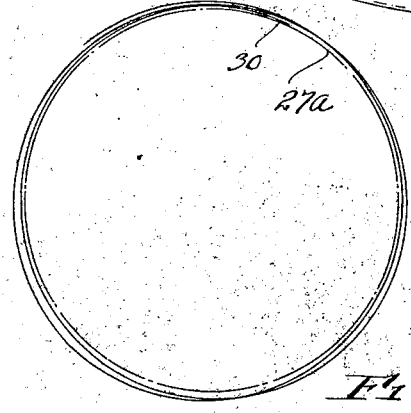

In the drawings Fig. 1 is a side elevation of a tire form with one lamination applied thereto and illustrating the beginning of the application of a second lamination; Fig. 2 is a diagrammatic representation of the tire form with four laminations applied thereto and illustrating the manner of forming individual beads for the laminations when using a continuous strand of bead wire; Fig. 3 is a fragmentary perspective view of a portion of the form and bead structure of the carcass and two laminations of the tire carcass illustrating the manner of progressing the bead strand from one lamination to another without interfering with the individuality of the bead structure of each lamination; Fig. 4 is a fragmentary side elevation showing the manner of splitting the laminations to progress the strand from one lamination to another; Figs. 5, 6 and 7 are cross-sectional views illustrating the progress of the strand from one lamination to another; Fig. 8 is a diagrammatic cross-section of a tire casing with the rubber finishing strips in assembled position upon the carcass; Fig. 9 is a cross-sectional view of a tire casing made in accordance with this invention illustrating the adaptability of the individual bead structure of each fabric lamination in the casing when the aggregate is molded into a composite bead; Fig. 10 is a diagram of the loops of the bead.

A tire in which the laminations are provided with individual bead structures whereby the adaptation of the laminations to internal stresses is unopposed by the composite bead structure when the assembled casing is inflated in the tire mold, may have two or more laminations as desired, the four lamination structure shown in the drawings being chosen merely for convenience in illustration. Briefly such a tire carcass may comprise, as shown in Fig. 8, four laminations or layers of tire cord, 12, 13, 14 and 15 and bead reinforcing or finishing fabric strips 16 and 17. Rubber finishing strips 20 complete the side wall structures and are overlapped by a tread strip 21 under which is placed the usual breaker strip 22. The cord laminations 12 to 15 are assembled upon a tire form and the individual beads for these strips comprise a composite bead when the tire is finally molded and cured.

A suitable form as shown in Figs. 1 and 2, may comprise a collapsible core 25 having removable wedge-shaped portions 26, the core being held together as a revolving unit in a well known manner. The core 25 may be provided with flanges 27 which determine the bead diameter of the assembled carcass as will be hereinafter set forth. Any suitable means may be provided on the core for detachably securing free ends 31 of continuous bead strands 30 thereto. If desired, the bead finishing strips 16 and 17 may first be applied to the core 25 to overlie the side surfaces of the core and circumferential surfaces of the flanges 27. The free ends 31 of the strand may pass through small openings formed in the strips and into engagement with the core, preferably extending through openings formed in the core flanges. The first layer or inner lamination of cords 12 may then be applied to the core and be pressed or "stitched" to conform to the cross-sectional contour of the form.

In Figs. 1 and 2 I have omitted the bead finishing strips 16 and 17 to more clearly illustrate the manner of continuing the bead strand from one lamination to another. As shown in Fig. 1 the first lamination has been completely applied to the form and the first convolution $30^a$ of the bead strand 30 has been applied thereto and the lamination edge $12^a$ has been turned outwardly, to completely enclose the convolution $30^a$ of the strand. The second lamination of fabric 13 is shown in Fig. 1 as being applied to the form over the first lamination with the cord strands thereof extending around the form at substantially 90° to the cords in the first lamination and the bead strands 30 are being simultaneously applied to the form. It is to be understood, however, that the lamination 13 could be applied to or completely pressed onto the form with the exception of the turned out portion $13^a$, and then the continuation of the first convolution of the bead strand could be continued through a second convolution, in which case the second convolution $14^a$ of the bead strand would be enclosed by turning outwardly the portion $13^a$ of the second lamination.

When assembling the lamination upon the core shown in Fig. 1, the beginning of each subsequently applied lamination should be at the splice of the preceding lamination whereby the bead strands may continue from one lamination to another by extending through the respective splices of the laminations. As shown in Figs. 3 to 7, however, it is not essential that the strands extend from one lamination to another at this point, for each strand may extend through a slit formed in the outwardly turned portion $12^a$ and through slit $13^b$ in the turned out portion $13^a$ of the second lamination 13. The slits are preferably spaced apart a sufficient distance that a short stretch of the cord strand may be disposed between the bead portions $12^a$ and $13^a$ as shown in Fig. 6 and whereby the progression of the bead strand from one lamination to the other may be uniform and without causing offsets or kinks in the strand.

It is to be understood that if desired, the bead strands may extend around the first lamination, say one and a fourth times before passing to the second lamination whence they extend around the second lamination one and a fourth times, etc., whereby the composite bead structure when finally formed in the mold may include five convolutions of bead strand in each bead structure. Such an application of the bead strand would permit the assembling of the laminations with the splices thereof disposed substantially 90° apart.

The particular advantages of a tire casing made in accordance with my process will be readily apparent from the cross section of the tire casing shown in Fig. 9, the composite bead structure of which comprises a plurality of individual beads, one for each lamination of the carcass. It will be noted in this figure that the convolution $30^a$ has expanded radially to a considerable distance away from the inner portion of the bead finishing strip 17 to which it originally was in the juxtaposed relation shown in Fig. 8. It will be also noted that the composite bead to the right in Fig. 9 shows the bead strand convolution $30^a$ as being substantially in its original assembled position while the convolution $30^c$ has expanded considerably and is out of juxtaposition to the finishing strip 17. The condition illustrated is not exaggerated for this relative displacement of the bead is due primarily to the drawing or relative sliding of the laminations within the side walls of the tire whereby each lamination seeks to take its quota of stress and no more.

The variations in the expansion of the bead strand convolutions, is dependent upon the amount of inequality of stress load upon the laminations. The relative adjustment takes place when the tire is being expanded into the vulcanizing mold.

When one loop or convolution is caused to expand, it contracts one or more of the adjacent loops until an even distribution of the strain has been effected. Such final relative position of the loops is illustrated by the diagram of Fig. 10 in which the broken line 27ª indicates the loop of an overwidth or loose lamination and the several loops of the other laminations are designated 30. When the vulcanizing is completed the finished tire has all of its several layers permanently adjusted and ready to equally resist the pressure of inflation. Tires made in accordance with this invention have shown remarkable wearing qualities and are capable of withstanding very severe treatment.

I claim:

1. The method of forming a tire carcass which includes the steps of applying a lamination of fabricated cord to a tire form while applying a strand of bead forming material to the lamination adjacent each of its circumferential edges, turning said edges upwardly and outwardly whereby a convolution of each strand is completely enclosed by a turned edge of said lamination substantially joining the ends of the lamination, applying a second separate lamination to the first while engaging each circumferential edge thereof by a continuation of the respective strand engaging the first lamination and joining the ends of the second lamination, turning both edges thereof outwardly to enclose the second convolution of the strand and forming individual beads around the circumferential edges of subsequently applied laminations of material.

2. The method of constructing a tire casing which comprises placing a lamination of cord fabric material upon a tire forming core at each side of the carcass, applying a bead strand to the lamination adjacent its circumferential edge and substantially joining the ends of the lamination, applying a second lamination of material to overlie the first lamination and having its joining ends separated circumferentially of the tire relative to the ends of the first lamination and continuing the bead strand from the first lamination to the second lamination to form an individual bead therefor of substantially the same circumference and thus continuing the formation of individual beads of substantially the same circumference for each successive lamination applied to the form.

3. The method of forming a tire carcass which includes the steps of applying separate laminations of fabricated cord to a tire form while applying a strand of bead forming material to the laminations adjacent each of the circumferential edges of each lamination, forming said edges outwardly whereby said strand is completely enclosed by the edges of said lamination, slitting said turned edges, applying the second lamination to the first while engaging the circumferential edges thereof by continuations of the strands extending from the first lamination through said slits, turning the edges thereof outwardly to enclose these second convolutions of strands and forming and slitting individual beads along the circumferential edges of subsequently applied laminations of material whereby several convolutions of a continuous strand may form an individual bead for each fabric lamination.

4. A tire carcass comprising a plurality of laminations of fabric, each lamination being provided with a bead structure formed by a plurality of convolutions of a continuous bead strand, said bead strand passing through the material of the respective lamination to another.

In testimony whereof, I hereunto affix my signature.

JACKSON D. COMSTOCK.